(12) United States Patent
Lamesch et al.

(10) Patent No.: US 7,907,257 B2
(45) Date of Patent: Mar. 15, 2011

(54) METHOD FOR OPERATING A TIME-OF-FLIGHT IMAGER PIXEL

(75) Inventors: Laurent Lamesch, Lamadelaine (LU); Jochen Landwehr, Trier (DE)

(73) Assignee: IEE International Electronics & Engineering S.A., Luxembourg (LU)

( * ) Notice: Subject to any disclaimer, the term of this patent is extended or adjusted under 35 U.S.C. 154(b) by 294 days.

(21) Appl. No.: 11/997,046

(22) PCT Filed: Jul. 4, 2006

(86) PCT No.: PCT/EP2006/063836
§ 371 (c)(1),
(2), (4) Date: Feb. 4, 2009

(87) PCT Pub. No.: WO2007/014818
PCT Pub. Date: Feb. 8, 2007

(65) Prior Publication Data
US 2009/0135404 A1 May 28, 2009

(30) Foreign Application Priority Data
Jul. 27, 2005 (EP) .................................... 05106920

(51) Int. Cl.
*G01C 3/08* (2006.01)
(52) U.S. Cl. ....................................... 356/5.01
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS
4,757,200 A 7/1988 Shepherd et al.
6,373,557 B1 4/2002 Mengel et al.
6,822,681 B1 * 11/2004 Aoki .............................. 348/296

FOREIGN PATENT DOCUMENTS
WO 2006010284 2/2006

OTHER PUBLICATIONS

Sprigi, T., et al. "The Multitap Lock-In CCD with Offset Subraction." IEEE Transactions on Electron Devices, IEEE Service Center, Piscataway, NJ, US, vol. 44, No. 10, Oct. 1997, pp. 1643-1647, XP000703874; ISSN: 0018-9383; Sections IV-VI on pp. 1645-1646.
International Search Report; PCT/EP2006/063836; Sep. 11, 2006.

* cited by examiner

*Primary Examiner* — Thomas H Tarcza
*Assistant Examiner* — Luke D Ratcliffe
(74) *Attorney, Agent, or Firm* — Cantor Colburn LLP

(57) ABSTRACT

A time-of-flight imager pixel has a light-sensitive region, a first and a second integration gate associated with the light-sensitive region, a first and a second sense node, a first output gate arranged between the first integration gate and the first sense node and a second output gate arranged between the second integration gate and the second sense node, a method for operating such a pixel includes
exposing the light-sensitive region to light so as to optically generate charge carriers;
collecting the charge carriers alternatively under the first and second integration gates;
adjusting voltages of the first and second output gates and the first and second integration gates, thereby transferring a first portion of the charge carriers from the first integration gate into the first sense node and a second portion from the second integration gate into the second sense node;
calculating time-of-flight information based on the first and second portions of charge carriers.
adjusting at least one voltage so as to transfer, if respectively the first and/or second integration gate is close to or in saturation, an amount of charge carriers form the first and/or or second integration gate into the first and/or second sense node; and
testing whether a voltage change exceeding a given threshold was thereby provoked in the first and/or second sense node.

16 Claims, 4 Drawing Sheets

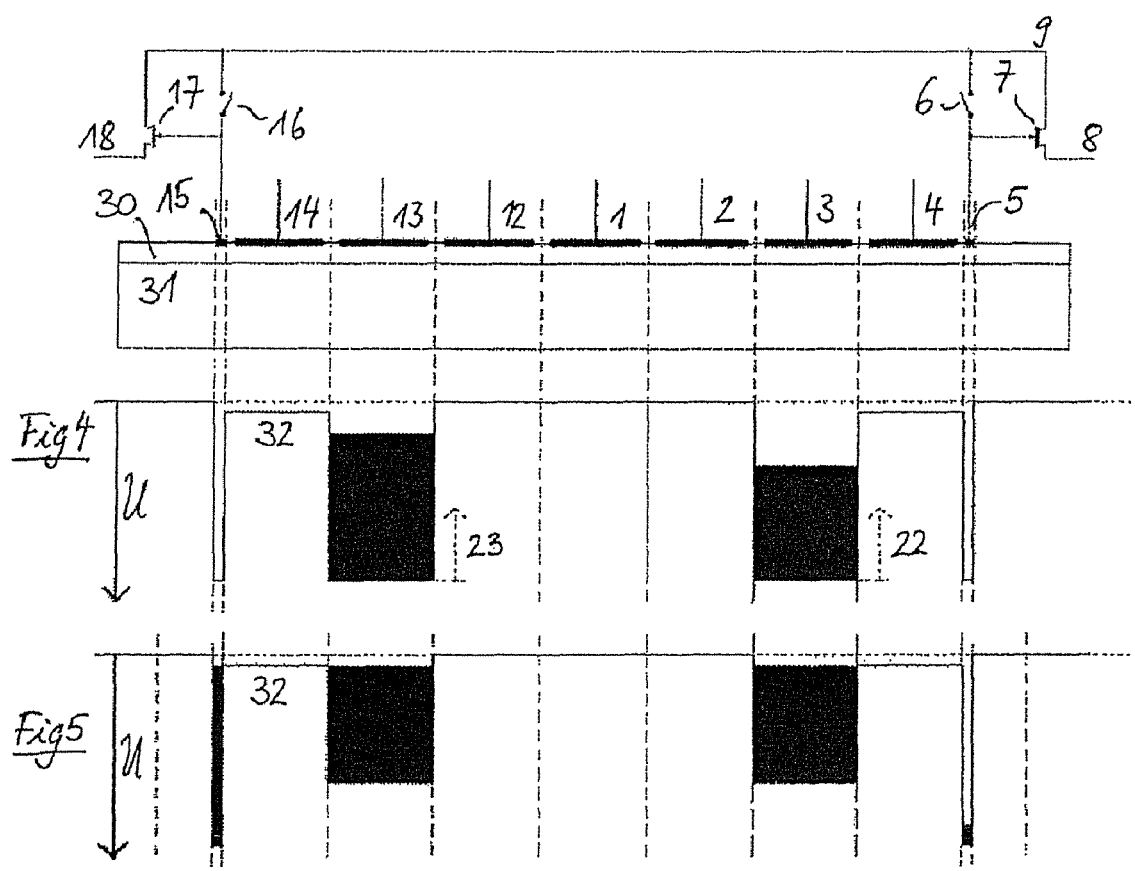

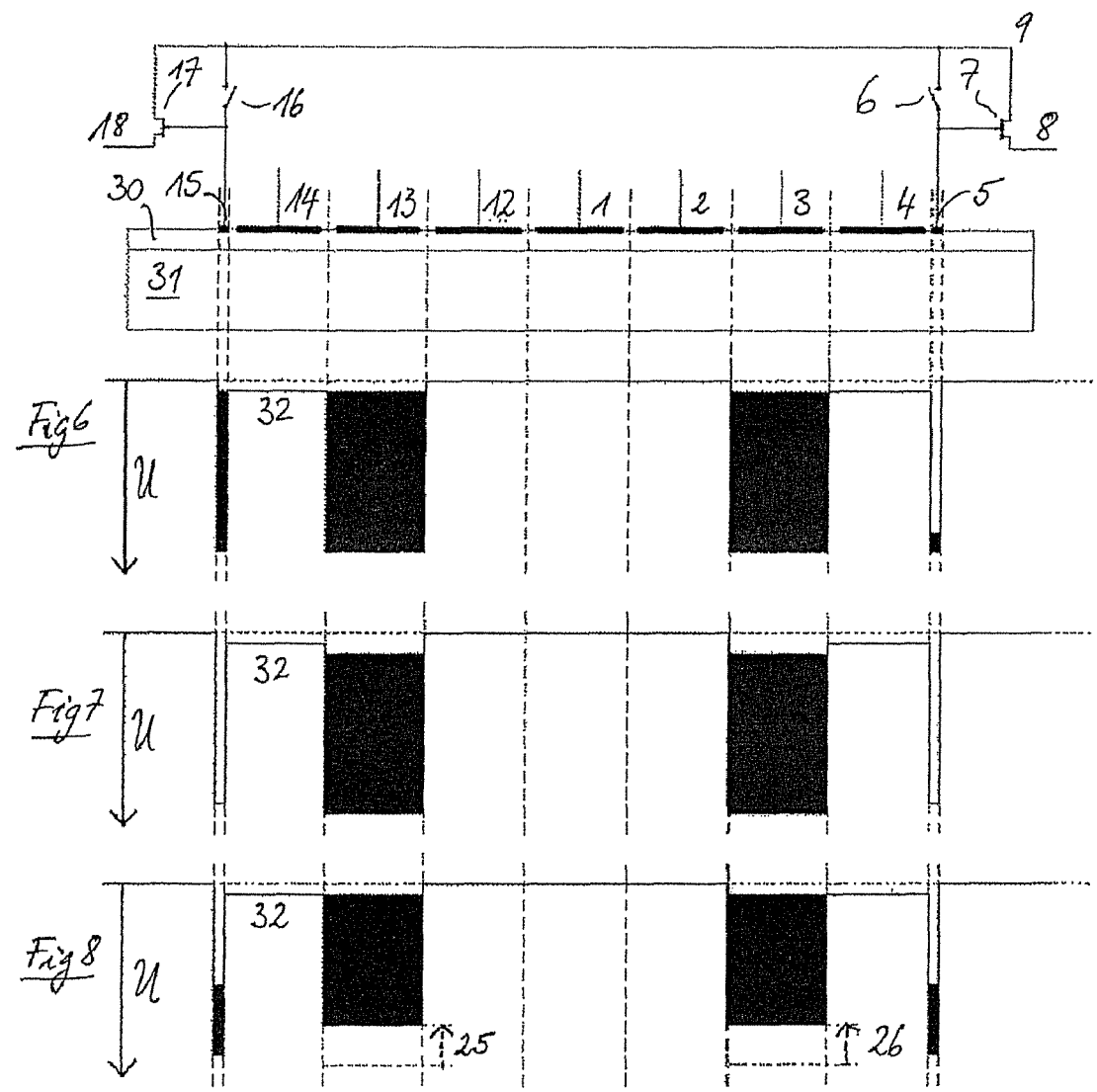

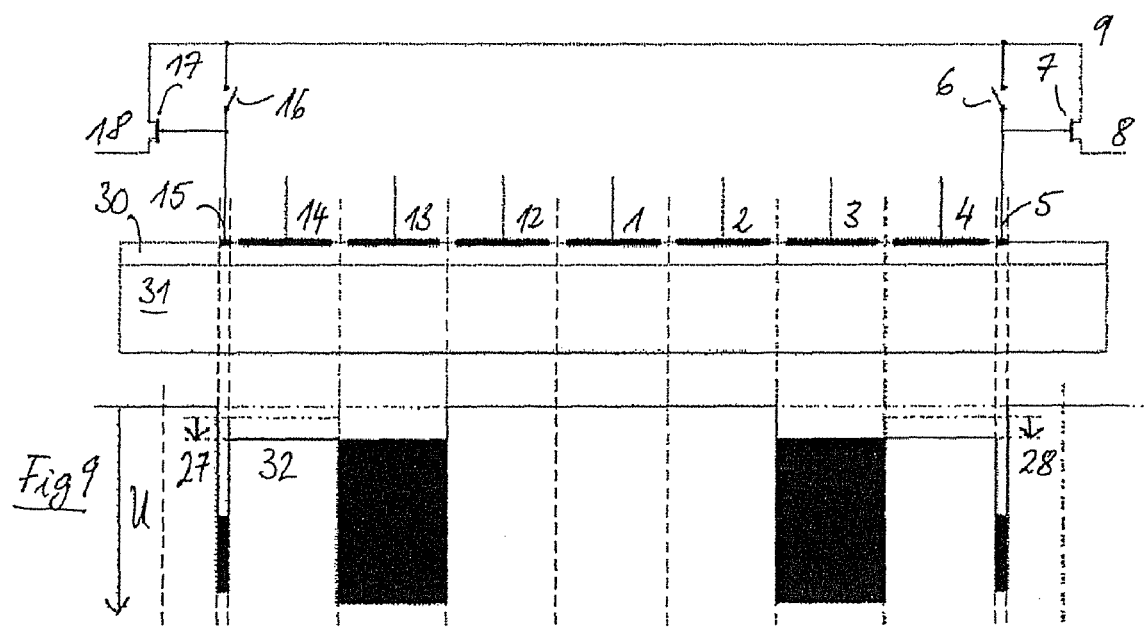

US 7,907,257 B2

METHOD FOR OPERATING A TIME-OF-FLIGHT IMAGER PIXEL

TECHNICAL FIELD OF THE INVENTION

The present invention generally relates to time-of-flight imaging, more particularly to a method for operating a time-of-flight imager pixel.

BRIEF DISCUSSION OF RELATED ART

Time-of-flight distance measuring or imaging systems use active illumination of the scene with a modulated light source. The pixels of a time-of-flight imager are synchronised with the modulated light source and accumulate charges under different integration gates within a period of the modulation. Charges are collected under each integration gate during a different time interval. Depending on the pixel configuration, the time interval can be distinct or partially overlapping. The relative phase difference between the pixel clock and the detected modulated light can be determined from the charge distribution under the integration gates.

In an advantageous method for reading out a time-of-flight imager pixel, only a small portion of the accumulated charge is taken into account. To achieve this, a sense node is associated with an integration gate. For the measurement, charge carriers are transferred from the integration gate onto the corresponding sense node until the sense node contains a sufficient charge for calculating the time-of-flight information. The transfer of charge carriers is stopped as soon as the conditions for a reliable measurement are met.

A major drawback in known implementations of this "minimal charge transfer" method is that an integration gate may unnoticeably saturate. Assume there is a saturated integration gate after exposure of the pixel to light. With the "minimal charge transfer" method, charge carriers are transferred from that integration gate into the corresponding sense node. The charge transfer is usually stopped when the threshold for a reliable measurement is reached, which is before the sense node completely filled. Consequently, the calculated time-of-flight is corrupt but not recognisable as such.

BRIEF SUMMARY OF THE INVENTION

The invention provides an improved method for operating an imager pixel, which allows detecting saturation of an integration gate.

A time-of-flight imager pixel the present invention applies to has a light-sensitive region, a first and a second integration gate associated with the light-sensitive region, a first and a second sense node, a first output gate arranged between the first integration gate and the first sense node and a second output gate arranged between the second integration gate and the second sense node. The method for operating such a pixel comprises:
 a) exposing the light-sensitive region to light so as to optically generate charge carriers;
 b) collecting the charge carriers alternatively under the first and second integration gates;
 c) adjusting voltages of the first and second output gates and the first and second integration gates, thereby transferring a first portion of the charge carriers from the first integration gate into the first sense node and a second portion from the second integration gate into the second sense node;
 d) calculating time-of-flight information based on the first and second portions of charge carriers.

According to an important aspect of the invention, the method further comprises:
 e) adjusting at least one voltage so as to transfer, if respectively the first and/or second integration gate is close to or in saturation, an amount of charge carriers form the first and/or second integration gate into the first and/or second sense node; and
 f) testing whether a voltage change exceeding a given threshold was thereby provoked in the first and/or second sense node.

The charge carriers are generated in the sensing region under the influence of light of the modulated light, which has been scattered somewhere in the field of view of the pixel. The generated charge carriers are then deviated alternatively to the first or the second integration gate and collected therein. The frequency of that alternation preferably corresponds to the modulation frequency of the light source. As will be appreciated, the pixel can comprise more than one sensing area and also more than two integration gates. There may be e.g. two sensing regions, one region being associated with the first and second integration gate, the other region being associated with the third and fourth integration gate.

It will be noted that the method includes "minimal charge transfer" from the integration gates to the corresponding sense nodes. The voltage on the first and second output gates is increased or decreased (depending on the type of charge carriers) and the voltage on the integration gates is accordingly decreased or increased. Thereby, while adjusting the voltages, charge carriers travel from the integration gates to the sense nodes. The charge transfer is stopped as soon as the transferred portions are suitable for calculating the time-of-flight information. The charge transfer is stopped by stopping the adjustment of the voltages. Additionally, the voltages may be set back to their initial values.

The skilled person will highly appreciate that in the present method saturation of an integration gate can be detected. To detect saturation of the first/second integration gate, the voltage of the first/second output gate can be adjusted by a defined value, the value being chosen such that, when the first/second integration gate is close to or in saturation, an amount of charge carriers is transferred into the first/second sense node. Alternatively, to detect saturation of the first/second integration gate, the voltage of the first/second integration gate can be adjusted by a given value, the value being chosen such that, if the first/second integration gate is close to or in saturation, an amount of charge carriers is transferred into the first/second sense node. A combined adjustment of an output gate voltage and the corresponding integration gate voltage is also possible. In this case, the values of adjustment of the output gate voltage and the corresponding integration gate voltage are preferably chosen such that if the integration gate is close to or in saturation, an amount of charge carriers is transferred into the corresponding sense node.

The voltage adjustment of step e) can induce a charge transfer from the integration gates to the corresponding sense nodes, thereby provoking a voltage change on the latter. The closer an integration gate is to saturation, the higher is the amount of charge carriers transferred and the more important is also the voltage change on the sense nodes. Decision whether an integration gate was in or close to saturation is made depending on whether the voltage change exceeds a preset threshold. The threshold can be set higher or lower, depending on what amount of charge accumulated under the integration gate is deemed too high for allowing reliable calculation of time-of-flight information.

Saturation detection by steps e) and f) can be carried out between steps b) and c). Let us assume that the integration gate is in or close to saturation. As no charge carriers have been removed from the integration gate so far, a relatively small voltage adjustment is sufficient for transferring charge carriers from the integration gate to the sense node and thereby provoking a voltage change on the sense node. Evidently, the threshold for the voltage change in the sense node, which is used to determine whether saturation occurred, has to be adapted to the voltage adjustment inducing the charge carrier transfer. If the integration gate was not saturated, the same adjustment of the integration gate voltage and/or the output gate voltage induces only a smaller transfer of charge carriers into the sense node. Consequently, the voltage change in the sense node does not exceed the preset threshold and it can be concluded that no saturation occurred. A drawback of detecting saturation in the first place is that charge carriers are removed from the integration gates before the execution of the "minimal charge transfer" method, which could affect the time-of-flight information.

Preferably, however, saturation detection by steps e) and f) is carried out after step c). The charge carrier portions transferred in step c) are advantageously eliminated from the sense nodes prior to step e) and the voltages of the first and/or second integration gates are readjusted to an initial value prior to step e). This order of steps has the advantage that the outcome of step c) is not influenced by a previous withdrawal of charge carriers. In this case, a certain portion of charge carriers has already been removed from the integration gate when the saturation of an integration gate is to be detected. This is preferably taken into account when assessing whether saturation occurred or not. A well suited solution to this problem is to adjust the voltage in step e) by a value chosen such that if the first/second integration gate were substantially saturated, an amount of charge carriers capable of substantially filling or overfilling the first/second sense node would be transferred into the first/second sense node. The voltage adjusted in step e) can be the first and/or second output gate voltage or the first and/or second integration gate voltage. A combined adjustment of an output gate voltage and the corresponding integration gate voltage is also possible. It has to be noted that in an actual situation, the integration gates are not necessarily saturated when step e) is being executed: either because no saturation occurred during step a) and b) or because a sufficient amount of charge carrier has already been removed from the integration gates in step c). The value of the voltage adjustment is chosen such, that in the hypothetical situation of substantial saturation of an integration gate, an amount of charge carriers is transferred to the corresponding sense node that substantially fills the latter. The transfer of the charge carrier portion for determining time-of-flight information has been stopped when the charge carrier portion on the sense node is sufficient for determining the time-of-flight information. The stopping of the transfer occurred before the sense node is substantially filled. Consequently, an amount of charge carriers has been withdrawn from the integration gate, which is not sufficient for substantially filling the sense node. When the value chosen for the voltage adjustment in step e) is chosen such that if the first/second integration gate were substantially saturated an amount of charge carriers capable of substantially filling or overfilling the first/second sense node would be transferred into the first/second sense node, it is assured that, even if a certain charge carrier portion has already been withdrawn from the integration gate, a certain amount of charge carriers is nevertheless transferred onto the sense node. If thereupon the voltage change of the sense node exceeds a predefined threshold, a saturation condition is detected. The time-of-flight-information calculated in step d) thus is to be rejected. When step d) is to be executed after steps e) and f), time-of-flight information needs to be calculated only if no saturation condition was detected beforehand.

BRIEF DESCRIPTION OF THE DRAWINGS

Preferred embodiments of the invention will now be described, by way of example, with reference to the accompanying drawings in which:

FIG. 4: shows a potential distribution of the pixel at the beginning of a "minimal charge transfer" shift procedure;

FIG. 5: shows a fifth potential distribution of the pixel at the end of the "minimal charge transfer" shift procedure;

FIG. 6: shows a potential distribution of the pixel in case of saturation of an integration gate;

FIG. 7: shows the potential distribution of FIG. 6, with the difference that the charges have been eliminated from the sense nodes;

FIG. 8: shows the adjustment of the integration gate voltage for detecting saturation;

FIG. 9: shows the adjustment of the output gate voltages for detecting saturation.

DETAILED DESCRIPTION OF THE INVENTION

Figures 1, 2, 3:
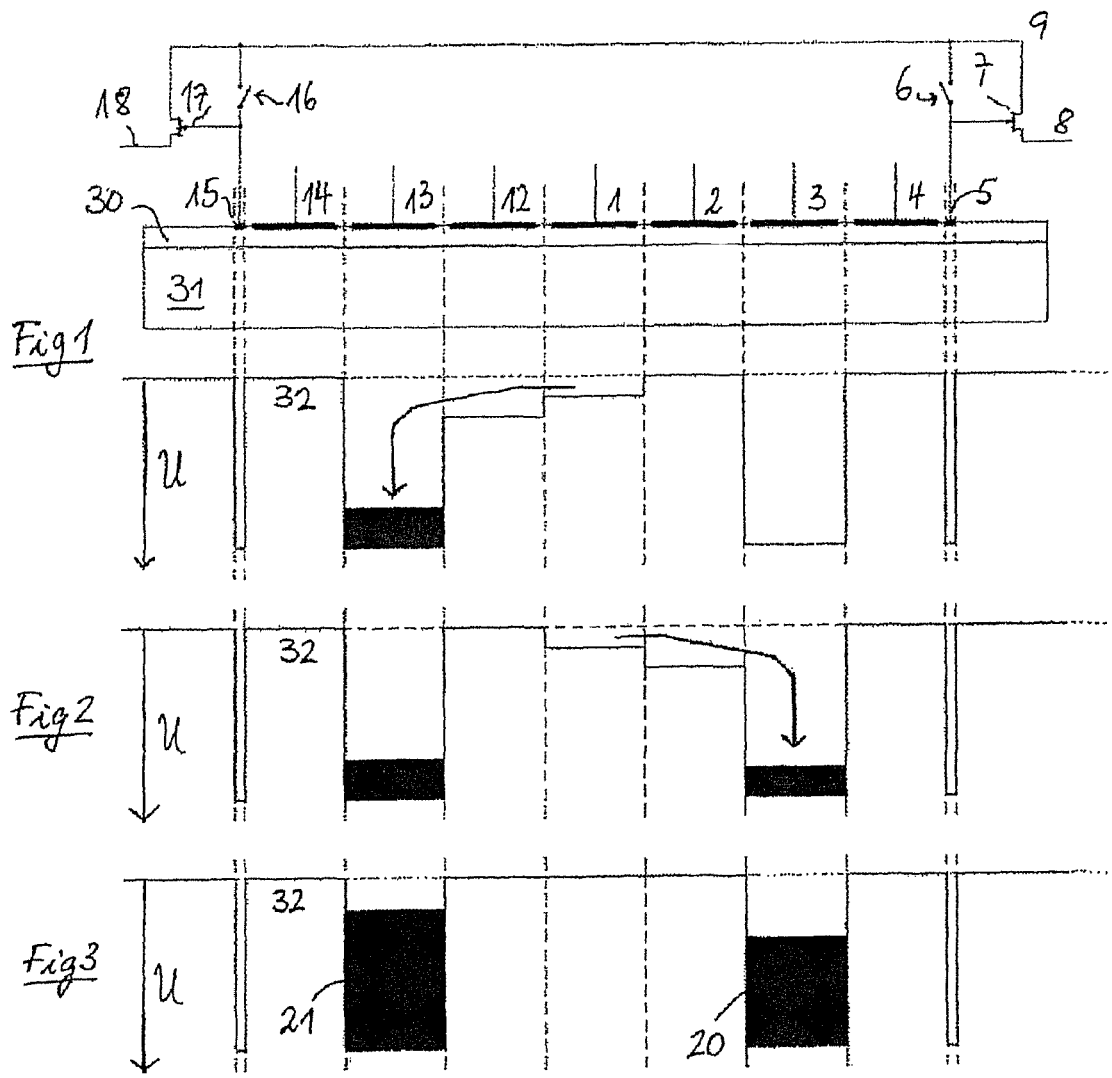
FIG. 1: is a cross-sectional schematic of a 3D time-of-flight imager pixel and a first potential distribution during exposure of the pixel to light.
FIG. 2: shows a second potential distribution during exposure of the pixel to light.
FIG. 3: shows a potential distribution of the pixel at the end of the light integration process.

FIG. 1 shows a cross-sectional schematic of a pixel of a time-of flight imager, with a light-sensitive middle gate 1, a right light-sensitive gate 2, a right integration gate 3, a right output gate 4, a right sense node 5, a right reset switch 6, a right source follower 7, a right output 8, and a left light-sensitive gate 12, a left integration gate 13, a left output gate 14, a left sense node 15, a left reset switch 16, a left source follower 17, and a left output 18. Reference numeral 9 designates the positive supply voltage, 30 the gate oxide. The bulk material 31 is preferably p-doped.

FIG. 1 also shows a first potential distribution 32 inside the pixel, which is created by applying the appropriate voltages to the gates 1, 2, 3, 4, 5, 12, 13, 14, 15. U designates the voltage axis. The potential distribution in FIG. 1 is such that the electrons, which are generated by the light falling on the light-sensitive gates 1, 2 and 12 are deviated to the left and are collected under the integration gate 13. A positive voltage on a gate creates a so-called charge bucket underneath the gate, where electrons can be collected.

FIG. 2 shows a second potential distribution 32. The potential distribution 32 in FIG. 2 is such that the electrons, which are generated by the light falling on the light-sensitive gates 1, 2 and 12 are deviated to the right and are collected under the integration gate 3.

The voltages on gates 2 and 12 are toggled with a certain modulation frequency in such a way that the two potential distributions depicted in FIGS. 1 and 2 are created alternatively, thus deviating the electrons to the left and right integration gates 3 and 13. The time-of-flight principle works with a modulated light source, which has the same modulation frequency as the light-sensitive gates 2 and 12. Thereby, the light-sensitive gates 2 and 12 form a phase-sensitive synchronous rectifier, which outputs a charge distribution between integration gates 3 and 13 that can be used to calculate the phase between the received light and the toggling of the light-sensitive gates 2 and 12. From this phase information, the time-of-flight of the emitted light can be deduced.

FIG. 3 depicts the potential distribution 32 at the end of the light integration procedure. The accumulated charges under the integration gates are shown with areas 20 and 21.

FIG. 4 represents the potential distribution 32 during the shift procedure (step c) of the present method). A portion of the charge collected under the integration gates 3 and 13 is transported to the respective sense nodes 5 and 15 by first increasing the voltage on the output gates 4 and 14 to a certain amount, thereby creating a path under the output gates 4 and 14 where the charge collected under integration gates 3 and 13 will be able to flow, and second continuously decreasing the voltage applied to integration gates 3 and 13. The voltages applied to the integration gates 3 and 13 are substantially equal. Arrows 22 and 23 indicate the change of the potential under the integration gates 3 and 13. During the shift procedure, the voltages on sense nodes 6 and 16 remain the same as long as no charges flow from integration gates 3 and 13 to the output sense nodes. As soon as the sense nodes receive charges, their respective voltage decreases. During the shift procedure, the voltages on sense nodes 6 and 16 are continuously measured and compared with the same fixed reference voltage. If the voltages on both sense nodes 6 and 16 have decreased below this fixed reference voltage, the decreasing of the integration gate voltages is stopped, as both sense nodes have received a voltage which can be used to calculate the phase information.

FIG. 5 shows the potential distribution 32 at the end of the shift procedure. The charges under the integration gates 3 and 13 are substantially equal, and both sense nodes contain some charge.

FIG. 6 depicts the potential distribution 32 for the case of a saturation of integration gate 13. This occurs when light falling on the pixel, e.g. sunlight, has created so many electrons that the bucket underneath the integration gate cannot hold any more electrons. This situation can be detected without changing the existing structure of the pixel, thereby avoiding extra costs of increased imager chip size for example. The shift procedure is performed as described above. FIG. 6 more specifically depicts the potential distribution 32 after the shift procedure if an integration gate bucket has been saturated during the light integration procedure. In order to determine whether or not the integration gate was saturated before the shift procedure, the remaining charge under the integration gate must be evaluated. If this charge is larger than a certain fixed threshold, then it is assumed that there has been saturation.

First, the charges accumulated on the sense nodes are eliminated by momentarily closing, then opening the reset switches 6 and 16, as shown in FIG. 7. Additionally, the integration gate voltage is reset to its maximum value. This is easily done as the integration gate voltages can be set externally for all the pixels of an imager without significant expense.

There are two options to perform the evaluation of the remaining charge under the integration gate. In the first option, the following steps are executed:

The integration gate voltages are decreased by a same fixed amount indicated by arrows 25 and 26 in FIG. 8. This amount is dimensioned so that if the integration gate buckets are fully filled, an amount of charge, which at least fully fills the sense nodes, is transferred into the sense nodes. The sense node voltages can then be read out, and compared to the same fixed voltage threshold. If at least one of the voltages is below this threshold, i.e. the voltage change is higher than a voltage-change threshold, this implies that some charge has been transferred to one sense node during the aforementioned saturation test, and this implies that at least one integration gate bucket has been filled with an amount of charge during the light integration procedure which is prone to lead to a saturation.

In the second option, the following steps are executed:

As shown in FIG. 9, the output gates voltages are increased by the same fixed amount indicated by identical arrows 27 and 28 in FIG. 9. This amount is dimensioned so that if the integration gate buckets are fully filled, an amount of charge, which at least fully fills the sense nodes, is transferred into the sense nodes. The sense node voltages can then be read out, and compared to the same fixed voltage threshold. If at least one of the voltages is below this threshold, this implies that some charge has been transferred to one sense node during the aforementioned saturation test, and this implies that at least one integration gate bucket has been filled with an amount of charge during the light integration procedure which is prone to lead to a saturation.

The invention claimed is:

1. A method of operating a time-of-flight imager pixel, said pixel having a light-sensitive region, a first and a second integration gate associated with said light-sensitive region, a first and a second sense node, a first output gate arranged between said first integration gate and said first sense node and a second output gate arranged between said second integration gate and said second sense node, said method comprising:
   a) exposing said light-sensitive region to light so as to optically generate charge carriers;
   b) collecting said charge carriers alternatively under said first and second integration gates;
   c) adjusting voltages on said first and second output gates and said first and second integration gates in such a way as to transfer a first portion of said charge carriers from said first integration gate into said first sense node and a second portion from said second integration gate onto said second sense node;
   d) calculating time-of-flight information based on said first and second portions of charge carriers;
   e) adjusting at least one voltage of the voltage on said first output gate and the voltage on said first integration gate so as to transfer, if said first integration gate is close to or in saturation, an amount of charge carriers form said first integration gate onto said first sense node; and
   f) testing whether a voltage change exceeding a given threshold was provoked on said first sense node by adjusting said at least one voltage in step e).

2. A method according to claim 1, wherein, in step e), the voltage on said first output gate is adjusted by a defined value, this value being chosen such that, when said first integration gate is close to or in saturation, an amount of charge carriers is transferred onto said first sense node.

3. A method according to claim 2, wherein said defined value is chosen such that, if said first integration gate were substantially saturated, an amount of charge carriers capable of substantially filling or overfilling said first sense node would be transferred onto said first sense node.

4. A method according to claim 1, wherein, in step e), the voltage on said first integration gate is adjusted by a given value, this value being chosen such that, if said first integration gate is close to or in saturation, an amount of charge carriers is transferred onto said first sense node.

5. A method according to claim 4, wherein said given value is chosen such that if said first integration gate were substantially saturated, an amount of charge carriers capable of substantially filling or overfilling said first sense node would be transferred onto said first sense node.

6. A method according to claim 1, wherein, in step e), the voltages on said first output gate and said first integration gate are adjusted by respective adjustment values such that, if said first integration gate is close to or in saturation, an amount of charge carriers is transferred onto said first sense node.

7. A method according to claim 4, wherein said adjustment values are chosen such that if said first integration gate were substantially saturated, an amount of charge carriers capable of substantially filling or overfilling said first sense node would be transferred onto said first sense node.

8. A method according to claim 1, wherein, in step e), at least one voltage of the voltage on said second output gate and the voltage on said second integration gate so as to transfer, if said second integration gate is close to or in saturation, an amount of charge carriers form said second integration gate onto said second sense node; and wherein, in step f) it is also tested whether a voltage change exceeding a given threshold was provoked on said second sense node in response to step e).

9. A method according to claim 8, wherein, in step e), the voltage on said second output gate is adjusted by a defined value, this value being chosen such that, when said second integration gate is close to or in saturation, an amount of charge carriers is transferred onto said second sense node.

10. A method according to claim 9, wherein said defined value is chosen such that, if said second integration gate were substantially saturated, an amount of charge carriers capable of substantially filling or overfilling said second sense node would be transferred onto said second sense node.

11. A method according to claim 8, wherein, in step e), the voltage on said second integration gate is adjusted by a given value, said value being chosen such that, if said second integration gate is close to or in saturation, an amount of charge carriers is transferred onto said second sense node.

12. A method according to claim 11, wherein said given value is chosen such that if said second integration gate were substantially saturated, an amount of charge carriers capable of substantially filling or overfilling said second sense node would be transferred onto said second sense node.

13. A method according to claim 8, wherein, in step e), the voltages on said second output gate and said second integration gate are adjusted by respective adjustment values such that, if said second integration gate is close to or in saturation, an amount of charge carriers is transferred onto said second sense node.

14. A method according to claim 13, wherein said adjustment values are chosen such that if said second integration gate were substantially saturated, an amount of charge carriers capable of substantially filling or overfilling said second sense node would be transferred onto said second sense node.

15. A method according to claim 1, wherein steps e) and f) are carried out between steps b) and c).

16. A method according to any one of claims 1, wherein steps e) and f) are carried out after step c), said first and second charge carrier portions are eliminated from said sense nodes prior to step e) and said voltages on the first and second integration gates are readjusted to an initial value prior to step e).

* * * * *